(12) United States Patent
Dörfler et al.

(10) Patent No.: US 6,702,082 B2
(45) Date of Patent: Mar. 9, 2004

(54) LEAF SPRING ARRANGEMENT, ESPECIALLY FOR ATTACHING THE PRESSURE PLATE OF A PRESSURE PLATE ASSEMBLY TO A HOUSING

(75) Inventors: Matthias Dörfler, Schweinfurt (DE); Andreas Orlamünder, Schweinfurt (DE); Andreas Dau, Würzburg (DE); Albert Kammermeier, Sulzheim (DE); Hartmut Bach, Schweinfurt (DE); Cora Carlson, Hambach (DE); Günther Esly, Wasserlosen (DE); Reinhard Feldhaus, Poppenhausen (DE); Ingrid Hoffelner, Knetzgau (DE); Christoph Kleuker, Gochsheim (DE); Paul Kraus, Niederwerrn (DE); Bernd Peinemann, Niederwerrn (DE); Michael Peterseim, Bergrheinfeld (DE); Gerhard Röll, Eisenheim (DE); Ralf Till, Eucrbach (DE); Sebastian Vogt, Bad Neustadt (DE)

(73) Assignee: Mannesmann Sachs AG, Schweinfurt (DE)

( * ) Notice: Subject to any disclaimer, the term of this patent is extended or adjusted under 35 U.S.C. 154(b) by 25 days.

(21) Appl. No.: 09/949,686

(22) Filed: Sep. 10, 2001

(65) Prior Publication Data

US 2002/0070089 A1 Jun. 13, 2002

(30) Foreign Application Priority Data

Sep. 8, 2000 (DE) .......................... 100 44 497
Jun. 1, 2001 (DE) .......................... 101 26 774

(51) Int. Cl.[7] .............................................. F16D 13/18
(52) U.S. Cl. ...................... 192/70.18; 267/47; 267/36.1; 267/160
(58) Field of Search .................. 192/70.18, 70.28; 267/283, 160, 47, 41, 36.1, 260, 261, 42, 44, 229

(56) References Cited

U.S. PATENT DOCUMENTS

| 264,911 A | * | 9/1882 | Vines | 267/36.1 |
| 351,145 A | * | 10/1886 | Wright | 267/36.1 |
| 857,054 A | * | 6/1907 | Haeske | 267/261 |
| 1,083,734 A | * | 1/1914 | Dunn | 267/36.1 |
| 1,274,542 A | * | 8/1918 | Hartmann | 267/261 |
| 2,594,665 A | * | 4/1952 | Lockwood | 267/28 |
| 2,986,388 A | * | 5/1961 | Page | 267/53 |
| 3,921,965 A | * | 11/1975 | Skerry | 267/47 |
| 4,269,400 A | * | 5/1981 | Jensen | 267/153 |
| 4,456,232 A | * | 6/1984 | Shinbori et al. | 267/214 |
| 4,460,167 A | * | 7/1984 | Silvis et al. | 267/42 |
| 4,577,740 A | * | 3/1986 | Carmillet | 192/70.18 |
| 4,579,207 A | * | 4/1986 | Uenohara et al. | 192/70.18 |
| 4,690,259 A | * | 9/1987 | Naudin | 192/70.28 |
| 4,919,404 A | * | 4/1990 | Santini | 267/260 |
| 5,090,537 A | * | 2/1992 | Fukuda | 192/70.27 |
| 5,228,665 A | * | 7/1993 | Berghus et al. | 267/262 |

FOREIGN PATENT DOCUMENTS

DE 198 48 582 4/2000

* cited by examiner

Primary Examiner—Robert A. Siconolfi
(74) Attorney, Agent, or Firm—Cohen, Pontani, Lieberman & Pavane (57) ABSTRACT

A leaf spring arrangement, especially for connecting a pressure plate to a housing, comprises a plurality of adjacent leaf spring elements, where each leaf spring element has a first attachment area for establishing the connection the pressure plate, a second attachment area for establishing the connection to the housing, and a connecting area extending between the first attachment area and the second attachment area. At least certain areas of at least two of the leaf spring elements are spaced apart between their first attachment area and their second attachment area.

14 Claims, 6 Drawing Sheets

LEAF SPRING ARRANGEMENT, ESPECIALLY FOR ATTACHING THE PRESSURE PLATE OF A PRESSURE PLATE ASSEMBLY TO A HOUSING

BACKGROUND OF THE INVENTION

1. Field of the Invention

The present invention pertains to a leaf spring arrangement, especially for attaching the pressure plate of a pressure plate assembly to a housing, comprising a plurality of adjacent leaf spring elements, where each leaf spring element has a first attachment area for establishing a connection to a first element, preferably the pressure plate, a second attachment area for establishing a connection to a second element, preferably the housing, and a connecting area extending between the first attachment area and the second attachment area.

2. Description of the Related Art

Figure 1:
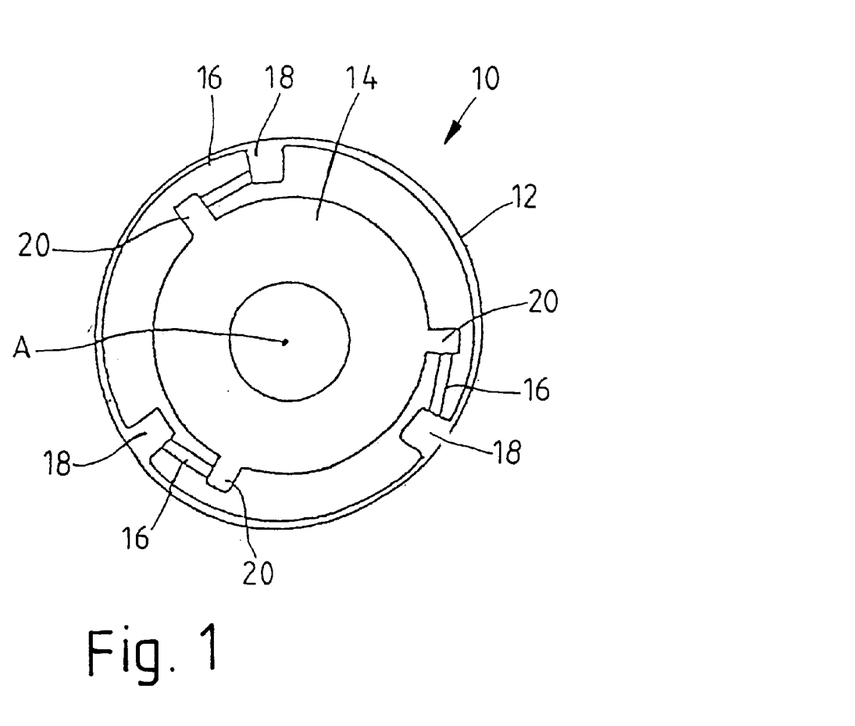
FIG. 1 shows a schematic, axial view of a pressure plate assembly.

A pressure plate assembly in which a plurality of leaf spring arrangements is used is known from DE 198 48 582 and illustrated schematically in FIG. 1. This pressure plate assembly 10 comprises a housing arrangement 12, which can be fixed to a flywheel arrangement in a manner known in and of itself to form a friction clutch. A pressure plate 14 is mounted in the housing arrangement 12. The housing arrangement 12 and the pressure plate 14 are connected to each other by a plurality of leaf spring arrangements 16 arranged in a row around the circumference in such a way that the pressure plate 14 is able to move with respect to the housing arrangement 12, namely, in the same direction as that in which a rotational axis A extends, to enable the clutch to engage and disengage, but is completely unable to rotate around the rotational axis A relative to the housing 12 or is at most able to rotate within only a relatively small angular range. Both the housing 12 and the pressure plate 14 have sections 18, 20, to which the leaf spring arrangements 16 can be attached; in the case of the pressure plate 14, for example, these sections can be formed by radially outward-projecting attachment arms. In the case of the housing 12, they can take the form of several recessed areas, created during the process by which the housing was shaped.

Figure 2:
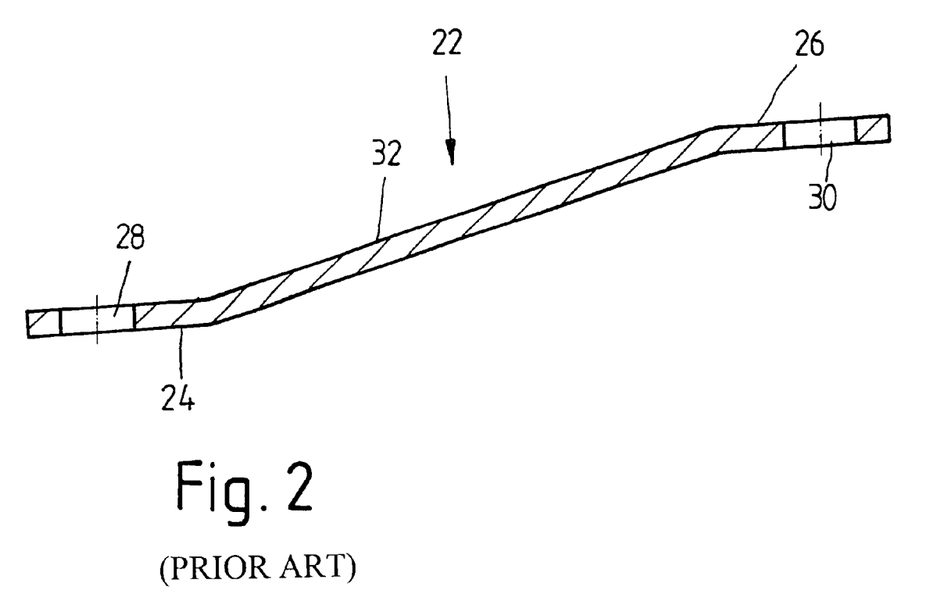
FIG. 2 shows a longitudinal cross section of a prior art leaf spring element used in the pressure plate assembly according to FIG. 1.

It is known that leaf spring arrangements comprising a plurality of adjacent leaf spring elements 22, similar to those shown in FIG. 2 by way of example, can be used. These leaf spring elements 22 have a first attachment area 24 and a second attachment area 26. A hole 28, 30, through which a fastening bolt can be inserted, is provided in each of the attachment areas 24, 26. These fastening bolts then establish the connection to the associated attachment sections 18, 20.

A connecting area 32 extends between the two attachment areas 24, 26. It can be seen in FIG. 2 that the two attachment areas 24, 26 extend at an angle with respect to the connecting area 32. The attachment areas 24, 26 are essentially parallel to each other and thus bent away from the connecting area 32 in opposite directions. It can also be seen in FIG. 2 that the two attachment areas 24, 26 have the same length, starting from the point where they join with the connecting area 32. When a leaf spring arrangement or a leaf spring package consisting of a plurality of these types of leaf spring elements 22, as shown in FIG. 2, is assembled, the problem arises that, because the first and second attachment areas 24, 26 are all of the same length, the holes 28, 30 in the adjacent attachment areas 24, 26 are slightly offset from each other when these leaf spring elements 22 are laid directly on top of one another, which makes it difficult to insert the fastening bolt all the way through these holes 28, 30. After the fastening bolts have been inserted through these holes 28, 30, furthermore, the leaf spring elements are held under tension even when no outside load is being exerted on them. This tension increases significantly under load, because the leaf spring elements then have the tendency to come into even closer contact with each other; that is, they are pressed with greater force against each other. Thus more intense frictional interactions occur in the surface areas which are in contact with each other, which brings with it the danger that at least some of the leaf spring elements of a stack of this type will experience premature fatigue or breakage.

The problem just described occurs primarily in the types of pressure plate assemblies in which a self-reinforcing contact interaction occurs between the pressure plate and the friction surfaces of the clutch disk. This self-reinforcing effect can be achieved, for example, by increasing the angle by which the attachment areas 24, 26 shown in FIG. 2 are bent with respect to the connecting area 32. In the extreme case, this angle can reach a value in the range of 45°.

SUMMARY OF THE INVENTION

It is the object of the present invention to provide a leaf spring arrangement which, while providing the necessary elasticity or spring action, is easier to install and offers a prolonged service life.

In accordance with a first aspect of the present invention, this object is achieved by a leaf spring arrangement, especially for attaching the pressure plate of a pressure plate assembly to a housing, comprising a plurality of adjacent leaf spring elements, where each leaf spring element has a first attachment area for establishing a connection to a first element, preferably the pressure plate, a second attachment area for establishing the connection to a second element, preferably the housing, and a connecting area extending between the first attachment area and the second attachment area. It is also provided that at least certain areas of the minimum of two leaf spring elements between the first attachment area and the second attachment area are spaced apart.

By providing at least two leaf spring elements with at least certain areas where they do not rest against each other, free space or escape room is created, into which the various leaf spring elements can move without coming into contact with each other or pressing against each other with considerable force when they are deformed. The stress effects described above can therefore be avoided both in the presence and in the absence of load.

An especially advantageous embodiment provides that the minimum of two leaf spring elements contact each other only in the areas of their first and second attachment areas.

Preventing the two leaf spring elements from contacting each other at least along a portion of their length can be achieved, for example, by bending the first attachment area and/or the second attachment area of the minimum of two leaf spring elements at an angle to the connecting area between them, by making the first attachment area of one of the minimum of two leaf spring elements longer than the first attachment area of the other of the minimum of two leaf spring elements, and/or by making the second attachment area of one of the minimum of two leaf spring elements shorter than the second attachment area of the other of the minimum of two leaf spring elements.

Especially when a relatively large number of leaf spring elements is to be provided, it is advantageous for at least one additional leaf spring element to be installed between the minimum of two leaf spring elements and for the first attachment area and the second attachment area of the minimum of one additional leaf spring element to be essentially of equal length. At least certain areas of this minimum of one additional leaf spring element are then a certain distance away from the adjacent leaf spring element.

According to another advantageous aspect of the present invention, it can be provided that the minimum of two leaf spring elements are essentially of the same design, where the first attachment area of the first of the minimum of two leaf spring elements is essentially equal in length to the second attachment area of the other of the minimum of two leaf spring elements, and where the second attachment area of the first of the minimum of two leaf spring elements is equal in length to the first attachment area of the other of the minimum of two leaf spring elements.

In an alternative design of the present invention, which can be combined with the variant previously described, the separation of at least certain areas of the leaf spring elements from each other can be achieved by bending the first attachment areas and/or the second attachment areas of the minimum of two leaf spring elements at an angle to the areas connecting them and by providing a spacer between the two corresponding attachment areas of the minimum of two leaf spring elements extending at an angle with respect to their associated connecting areas.

Thus it is possible for the first spacer to be designed as a part separate from the minimum of two leaf spring elements, preferably being formed by the first element or by the second element e.g., by the pressure plate or the housing. As an alternative, it can be provided that the first spacer is formed as an integral part of one of the minimum of two leaf spring elements.

To provide relief also in those areas in which the leaf spring arrangements border on the first element or on the second element, it is also proposed that a second spacer be provided between the leaf spring element bordering on the first element and the first element and/or between the leaf spring element bordering on the second element and the second element.

It can also be provided that the second spacer is designed as an integral part of the leaf spring element resting against it. As an alternative, it can be provided that the second spacer is designed as a part separate from the leaf spring element resting against it.

The assembly of a leaf spring arrangement of this type can be facilitated by providing the first spacer and the second spacer on a single spacer component.

According to an alternative embodiment of the present invention, the object cited above is achieved by a leaf spring arrangement, especially for connecting the pressure plate of a pressure plate assembly to a housing, comprising a plurality of adjacent leaf spring elements, where each leaf spring element has a first attachment area for establishing the connection to a first element, preferably the pressure plate, a second attachment area for establishing the connection to a second element, preferably the housing, and a connecting area extending between the first attachment area and the second attachment area. The first attachment areas of the leaf spring elements and/or the second attachment areas of the leaf spring elements extend at an angle to their associated connecting areas, and each of the leaf spring elements has a hole in at least one attachment area, i.e., in the first or second attachment area, for a fastening bolt, which serves to attach the leaf spring elements to the first element or to the second element.

It is then also provided in accordance with the invention that, for at least one of the leaf spring elements, the hole in at least one of the attachment areas extending at an angle to the connecting area is larger in the longitudinal direction of the leaf spring element, which is essentially the same as the direction in which the leaf spring element extends between the first and the second attachment areas, than the corresponding section of the fastening bolt after insertion into its assigned hole.

In this design variant, the minimum of one leaf spring element is allowed a certain play with respect to the fastening bolt during the assembly process. This minimum of one leaf spring element can therefore be installed in a state in which no load is being exerted between it and any of the other leaf spring elements, a state which allows the fastening bolt to be inserted easily. In this way it is possible to arrive at an assembly situation in which, although the individual leaf spring elements are very close together and possibly even touching each other, their mutual contact is free of tension or compression in the load-free state of the leaf-spring arrangement.

To reduce the number of different parts, it is also proposed that at least two, preferably all, of the leaf spring elements be of the same design.

The present invention also pertains to a pressure plate assembly, comprising a housing and a pressure plate, which is connected by means of at least one leaf spring arrangement according to the invention to the housing with the freedom to move in the same direction as that in which the axis of the pressure plate assembly extends.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

A first embodiment of a leaf spring arrangement according to the invention is described with reference to FIGS. 3 and 4. This type of arrangement could be used in the pressure plate assembly 10 illustrated by way of example in FIG. 1.

Figure 3:
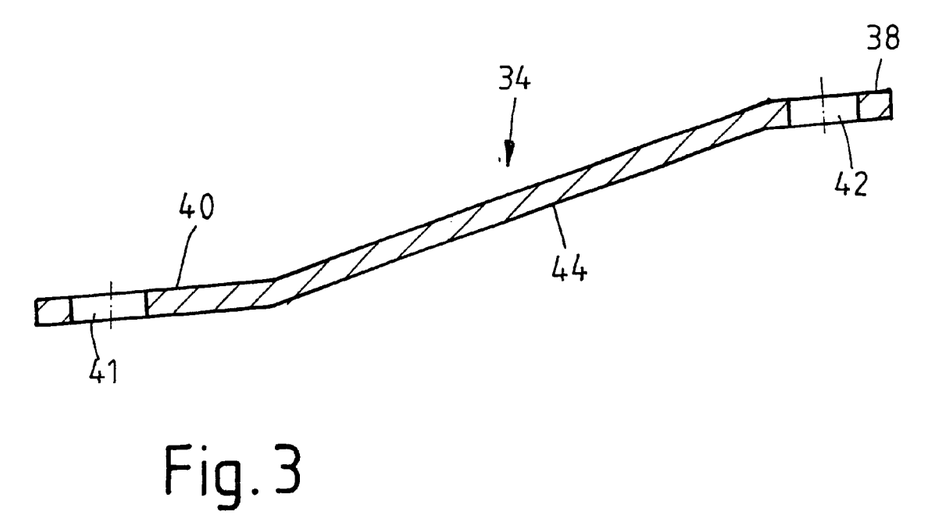
FIG. 3 shows a view similar to that of FIG. 2 of a leaf spring element used in a leaf spring arrangement according to the invention.

The leaf spring element 34 shown in FIG. 3 comprises two attachment areas 38, 40, each with a hole 41, 42. Again, a connecting area 44 extends between the two attachment areas 38, 40, and the two attachment areas 38, 40 are bent with respect to their connecting area 44, as also in the design according to FIG. 2, in such a way that they are essentially parallel to each other.

Figure 4:
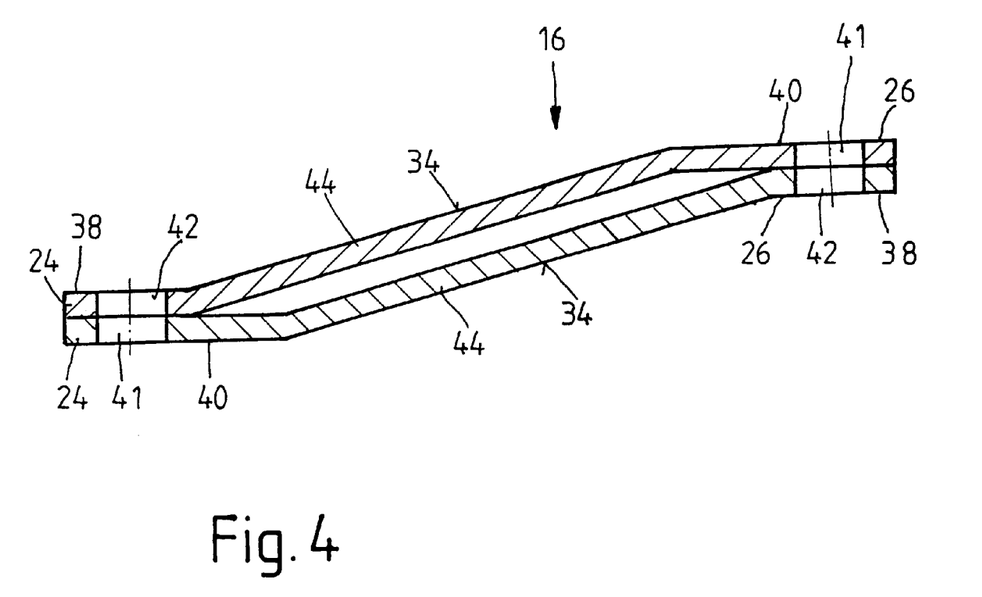
FIG. 4 shows a leaf spring arrangement of a first design according to the invention.

FIG. 4 shows a leaf spring arrangement 16, in which two of these leaf spring elements 34 are used. The two leaf spring elements 34 are oriented in opposite directions, so that the attachment area 38 of the one leaf spring element 34 is next to the attachment area 40 of the other leaf spring element and vice versa. Thus, for example, the attachment area 38 of the upper leaf spring element 34 forms a first attachment area 24, and the attachment area 40 of the lower leaf spring element 34 also forms a first attachment area 24. In a corresponding manner, the attachment area 40 of the upper leaf spring element 34 forms a second attachment area 26, and the attachment area 38 of the lower leaf spring element 34 forms a second attachment area 26. As a result, an arrangement is obtained in which the two leaf spring elements 34 rest against each other only in the area of their first and second attachment areas 24, 26, whereas otherwise they are separated from each other, especially along the extent of their connecting areas 44. It can be seen in particular that the different lengths of the attachment areas of the leaf spring elements 34 make it possible for the elements to be offset from each other in the direction in which the leaf spring elements and their attachment areas extend. As a result, the holes 41, 42 can be easily aligned with each other, which makes it easy to insert the fastening bolt without exerting any tension or compression on the components.

When the leaf spring elements 34 or leaf spring arrangements 16 are deformed, the individual leaf spring elements 34 can therefore easily bend out of shape independently of each other, without one leaf spring element interacting with the neighboring element in a way which essentially opposes the deformation of either one. Mutual frictional contact of the leaf spring elements with each other is avoided, which prevents any undesirable impairment to the spring characteristic and which also significantly increases the service life of a leaf spring arrangement 16 of this type.

Figure 5:
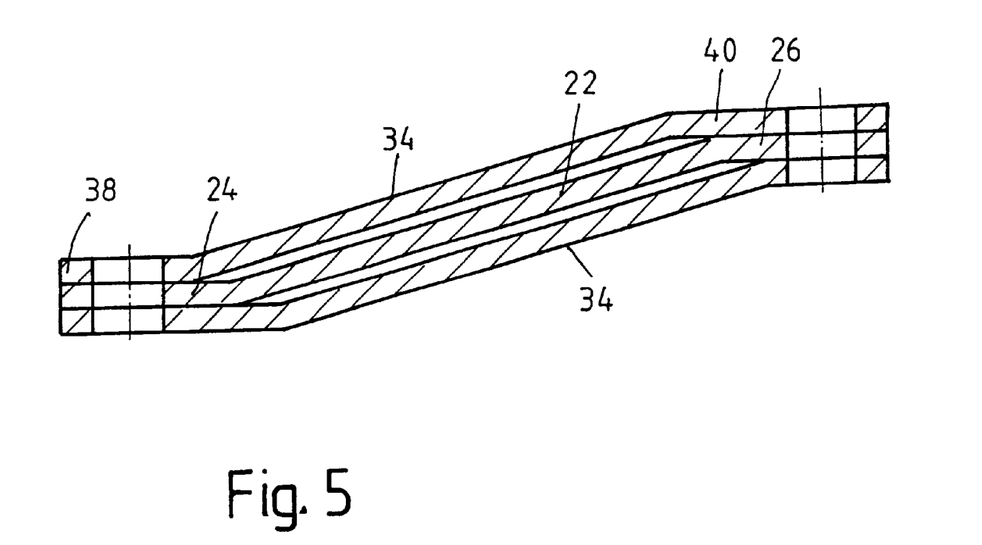
FIG. 5 shows a leaf spring arrangement of a second design according to the invention.

In the design variant shown in FIG. 5, a conventional leaf spring element 22, such as that illustrated in FIG. 2, is provided between the two leaf spring elements 34, 34, one on top, the other on the bottom, already discussed in connection with FIG. 4. In the case of this leaf spring element 22, its two attachment areas 24, 26 are essentially equal, this length being calculated so that it is longer than the short attachment areas 38 of the leaf spring elements 34 but shorter than the long attachment areas 40 of the leaf spring elements 34. An intermediate space, which allows the various components to form an assembly free of tension and which also allows the individual leaf spring elements to undergo deformation without causing any significant frictional contact between them, is therefore obtained between each of the leaf spring elements 34 and the leaf spring element 22.

It can be seen from the preceding description that, by assembling multiple leaf spring elements, the individual attachment areas of which have varied, graduated lengths, leaf spring arrangements consisting of relatively large numbers of leaf springs can ultimately be obtained. A significant advantage here is that ultimately each type of leaf spring element design can occur twice in a leaf spring arrangement of this type, namely, in the two installation positions in which they are reversed with respect to each other as shown in FIG. 4 and also in FIG. 5. The number of different parts which a manufacturer must keep on hand is therefore kept low.

Figure 6:
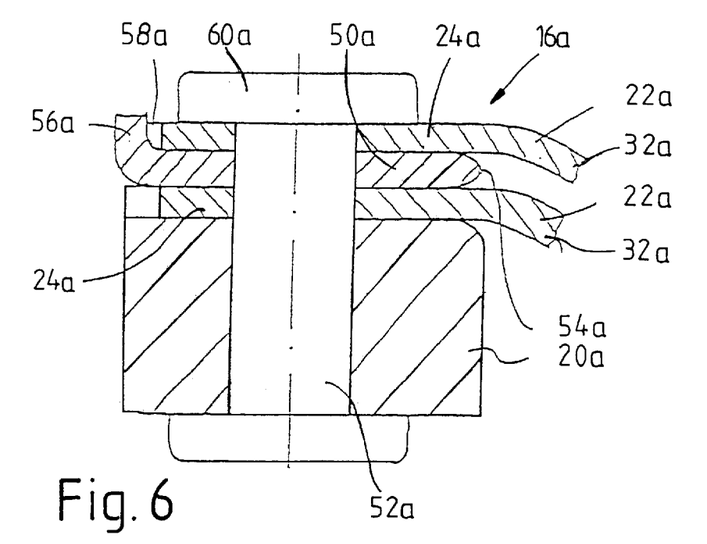
FIG. 6 shows a partial cross-sectional view in another design variant of a leaf spring arrangement according to the invention in the area of the connection to a pressure plate.
Figure 7:
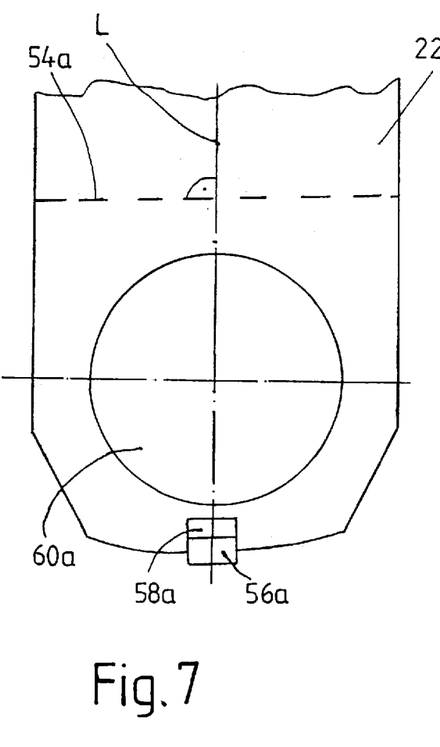
FIG. 7 shows a view from above of the leaf spring arrangement shown in FIG. 6 in the area of the connection to the pressure plate.
Figure 8:
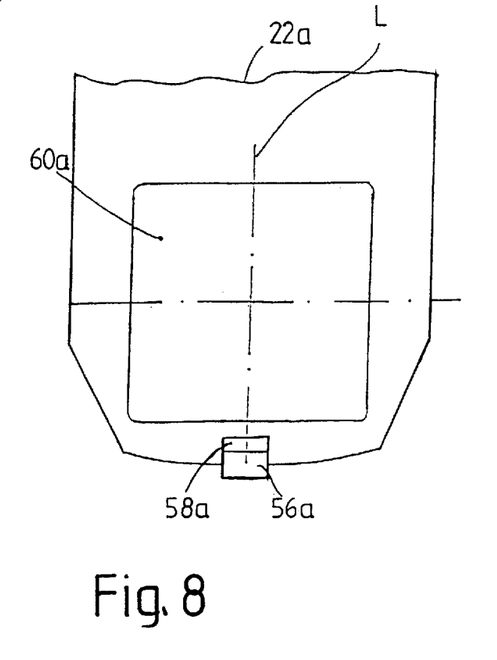
FIG. 8 shows a view similar to that of FIG. 7 of an alternative design of a fastening bolt.

An alternative design of a leaf spring arrangement according to the invention is shown in FIGS. 6–8. Components or parts of components which are the same as components or parts of components previously described are designated by the same reference number with an appended "a".

In the design variant shown in FIGS. 6–8, the two leaf spring elements 22a of the leaf spring arrangement 16a are again arranged in such a way that certain areas are separated from each other. The leaf spring elements 22a used in this design variant are essentially the same as those of the variant already illustrated in FIG. 2, in which the first and second attachment areas (in FIG. 6, only the first attachment area 24a can be seen) both have the same length between the point where they join to the connecting area 32a and the end. To provide a certain gap between the two leaf spring elements 22a in spite of this, a spacer 50a is provided, which, in the section illustrated, is inserted between the two attachment areas 24a. The spacer 50a, which can be made out of a piece of sheet steel, is held in place together with the two leaf spring elements 22a by a fastening bolt 52a, such as a fastening rivet, to a section 20a of a pressure plate. So that the various parts, especially the outside edge 54a of the spacer 50a, assume clearly defined positions with respect to each other, the spacer 50a can be provided with a positioning projection 56a, which engages in a corresponding positioning recess 58a in one of the leaf spring elements 22a. It is therefore ensured that the edge 54a is always perpendicular to a longitudinal center axis L of the leaf spring elements. So that the minimum amount of stress is exerted on the leaf spring elements 22a especially in the loaded, i.e., deformed, state, the edge 54a is preferably rounded, as can be seen in FIG. 6. It can also be provided that the head 60a of the bolt, which is usually circular, as shown in FIG. 7, has a straight-sided periphery, such as a rectangular or square contour, as shown in FIG. 8. This therefore means again that a load-exerting edge is obtained which is essentially perpendicular to the longitudinal center axis L, which makes it possible to avoid the concentration of loads or overloads at a single point on one or more of the leaf spring elements when they are stressed.

In this manner, especially when two leaf spring elements 22a of similar design are used, it can be ensured that these elements will not rest directly against each other and thus, when they make the transition to the loaded state, they do not rub or press against each other.

It is obvious but should nevertheless be pointed out that a configuration similar to that shown in FIG. 6 can also be provided in the area of the connection to the housing. In principle, however, a combination with the previously described design would also be possible, in which case in particular, as a result of the difference in the lengths of the connecting areas 32a, the two leaf spring elements 22a would rest against each other in the other, i.e., the second, attachment area.

Figure 9:
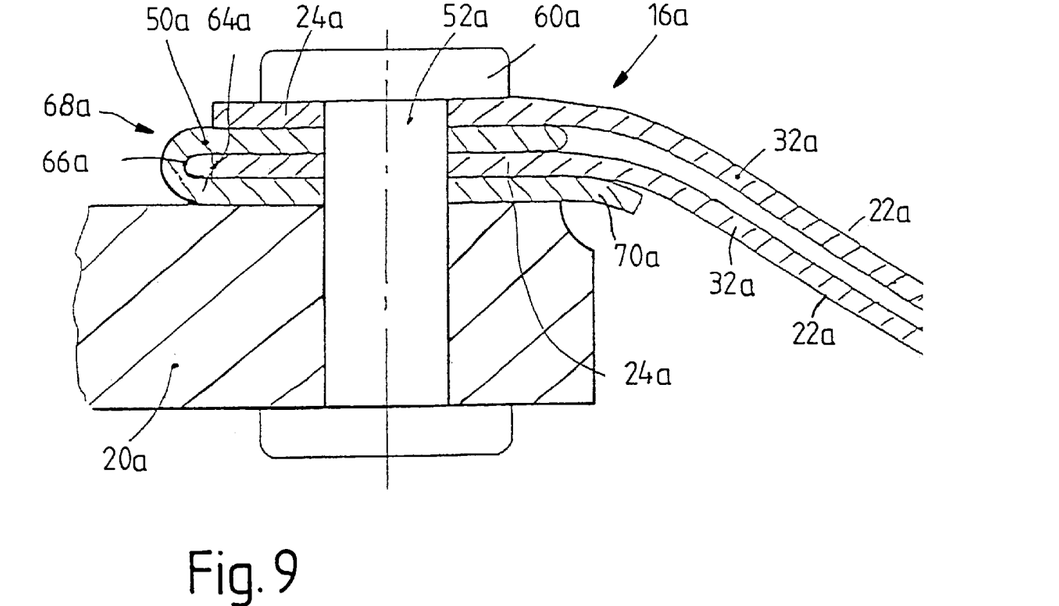
FIG. 9 shows another alternative design of the leaf spring arrangement according to the invention in the area of the connection to the pressure plate.

FIG. 9 shows a modification of the design variant of FIG. 6. A spacer 50a is inserted between the two first attachment areas 24a in this design variant as well. In addition, another spacer 64a is provided between the attachment area 24a of the lower leaf spring element 22a, which borders on the section 20a of the pressure plate, and this section 20a. This additional spacer 64a and the first-mentioned spacer 50a are preferably made as a single part of sheet steel, bent in the appropriate manner, the two spacers being connected to each other by a connecting section 66a. The radii of curvature are comparatively small here, but this is not critical in the sense that, after the parts of the assembly shown in FIG. 9 have been put together, the spacer component 68a can break at this point without causing any impairment to its functionality. The spacer 64a inserted between the lower leaf spring element 22a and the section 20a is bent over at its free end 70a in the same way that the leaf spring element 22a is bent. A rounded contact zone is therefore obtained for the leaf spring element 22a located next to the pressure plate, so that, especially when the section 20a of the pressure plate has acquired a sharp edge in the course of its final machining, sharp-edged contact is avoided. Providing both spacers 64a and 50a as part of a single spacer element, component 68a simplifies the work of assembling a leaf spring arrangement 16a of this type and thus the work of putting together the entire pressure plate assembly.

Figure 10:
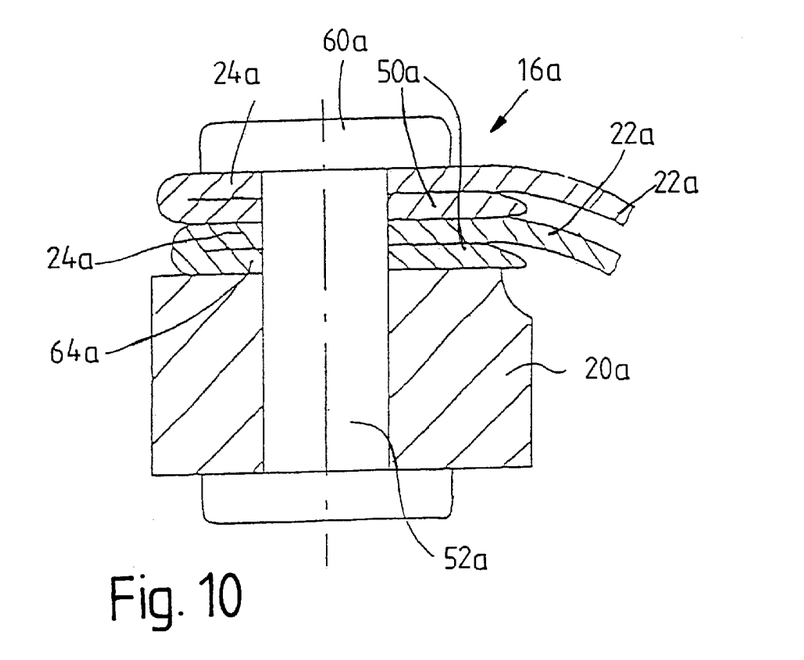
FIG. 10 shows a modification of the leaf spring arrangement shown in FIG. 9.

In the additional modified design shown in FIG. 10, a spacer 50a is again provided between the two leaf spring elements 22a, i.e., between their first attachment areas 24a. The spacer 64a is again situated between the lower leaf spring element 22a and section 20a of the pressure plate. In this variant, the two spacers 50a, 64a are designed as integral parts of their associated leaf spring elements 22a; that is, they are made by bending over the ends of the leaf spring elements. In this way, the number of components which must be made available can be further reduced; at the same time, it is easily possible to arrive at a certain axial distance between the two leaf spring elements and also to ensure that, when load or stress is applied to the leaf spring elements 22a, any sharp edges which may be present, such as the machined edge of section 20a, are prevented from digging into the leaf spring elements. For this purpose, it is again advantageous for the terminal areas of both or at least of one of the spacers 50a, 64a to be rounded by appropriate processing.

Figure 12:
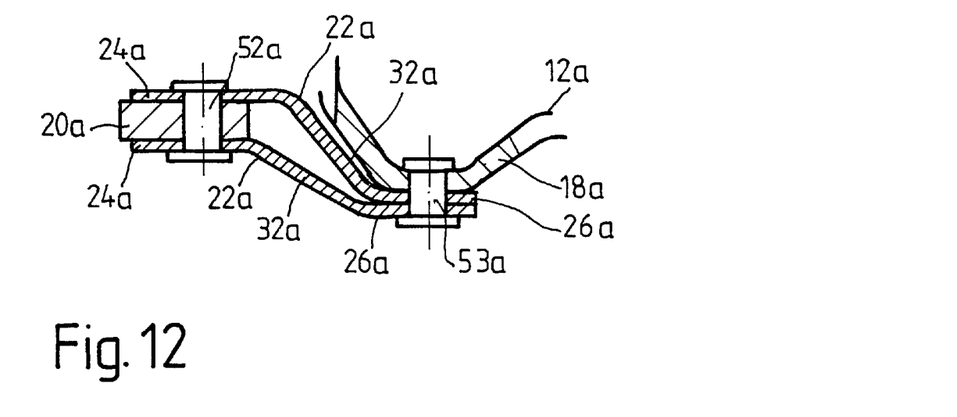
FIG. 12 shows another alternative design of the leaf spring arrangement according to the invention.

FIG. 12 shows another embodiment according to the invention, in which, by the use of spacers, it is again ensured that the two leaf spring elements 22a do not rest against each other; that is, the connecting areas of the leaf spring elements are protected from contact with other leaf spring elements. In the design shown in FIG. 12, the various first attachment areas 24a of the two leaf spring elements 22a assigned to each other are kept a certain distance away from each other by the insertion of the associated section 20a of the pressure plate between these first attachment areas 24a. That is, one of the leaf spring elements 22a, namely, the one farther away from the flywheel, is on the side of section 20a facing away from the flywheel, whereas the first attachment area 24a of the other of the leaf spring elements 22a is on the side of section 20a facing toward the flywheel. When these two attachment areas 24a are tightly fastened by means of the bolt 52a to the section 20a, then, as can be seen in FIG. 12, a gap between the two is present along their connecting areas. The avoidance of mutual contact in the areas which undergo deformation under load relieves the leaf spring elements 22a of stress and thus prevents damage to them. A significant reduction in the shear stress is obtained especially in the case of the leaf spring element 22a shown underneath in FIG. 12, which is bent at a smaller angle. Here, for example, spacers can be provided in the area of the second attachment areas 26a, as illustrated and described previously in conjunction with FIGS. 6–10.

Figure 13:
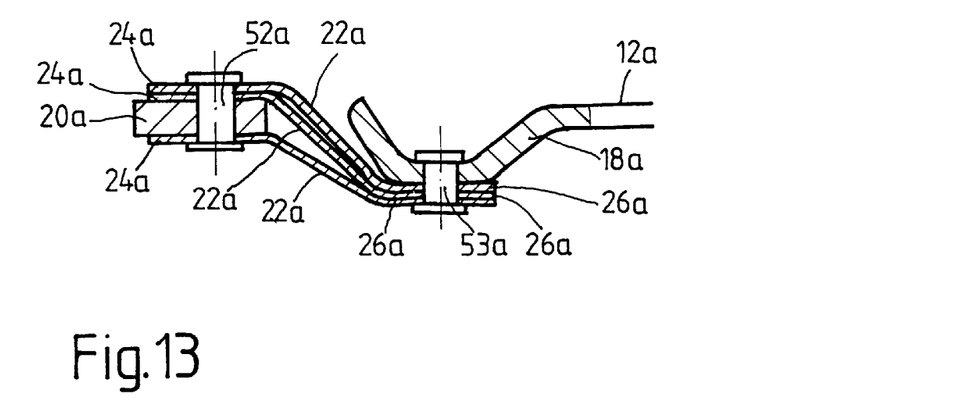
FIG. 13 shows a modification of the design shown in FIG. 12.

In the design variant shown in FIG. 13, in which the section 20a forms a spacer between the associated first attachment areas, a pair of leaf spring elements 22a is provided, which, for example, can be designed as described previously in conjunction with FIG. 4 in order to avoid mutual contact, especially in the connecting area.

Figure 14:
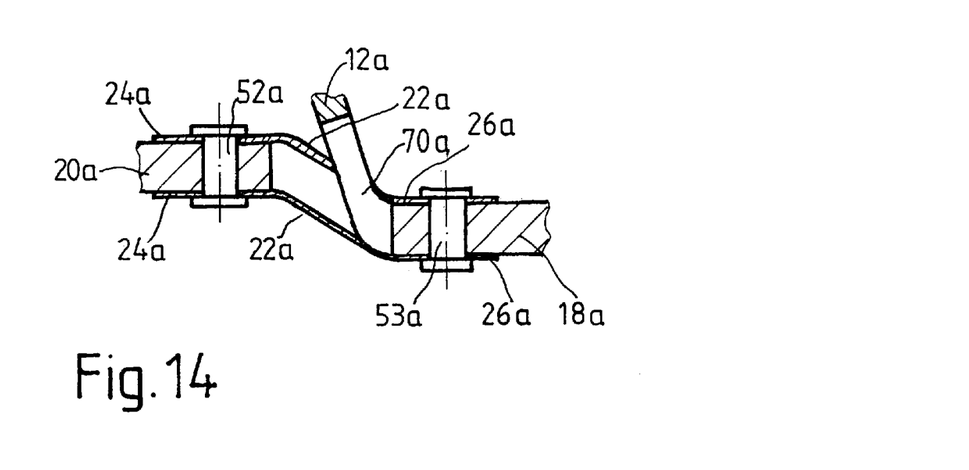
FIG. 14 shows another modification of the design shown in FIG. 12.

The variant shown in FIG. 14 is designed in such a way that spacers keep the leaf spring elements 22a apart from each other in both the first and the second attachment areas. Whereas the sections 20a of the pressure plate again form the spacers in the first attachment areas, the bent sections 18a of the housing arrangement 12a now provide the associated spacers in the second attachment areas. The second attachment areas 26a of the two leaf spring elements 22a are attached to the housing by clinch bolts 53a, and the spacers ensure that the second attachment areas 26a of these two leaf spring elements 22a are kept a certain distance apart. In this case, the two leaf spring elements 22a can be of the same design. It can be seen that a passthrough opening 70a is provided in the housing arrangement 12a to allow the upper leaf spring element 22a enough room to undergo deformation and also enough to room to allow the attachment of the spring elements to the section 18a.

Various designs of a leaf spring arrangement according to the invention have been described above, in which the special design of the leaf spring elements themselves and/or the use of spacers between the attachment areas of the leaf spring elements on at least one end ensures that at least certain areas, preferably the entire length of the connecting areas, of the leaf spring elements are kept a certain distance away from each other, this distance being sufficient to prevent frictional contact between them even when stress is exerted on them. The measures according to the invention, especially the special design or shape and the length of the attachment areas of the leaf spring elements, however, can also be implemented in such a way that only a slight separation distance of this type is present. The important point is that the pressure or load exerted by the leaf spring elements on each other is entirely or almost entirely eliminated.

Figure 11:
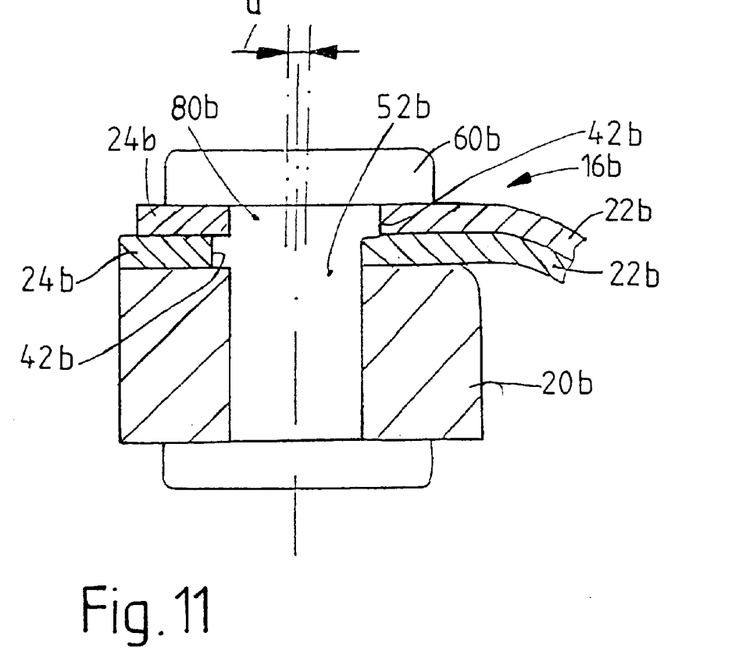
FIG. 11 shows another alternative design of the leaf spring arrangement according to the invention in the area of the connection to the pressure plate.

A design variant with the primary goal of minimizing the tensile stress which the leaf spring elements exert on each other, at least in the no-load state of these elements, is illustrated in FIG. 11. Components which are the same as those previously described or which perform the same function are designated with the same reference number with an appended "b".

In the design variant shown in FIG. 11, two leaf spring elements again are used, which are essentially of the same design; that is, the dimensions of their various component sections are essentially the same for all the elements. The holes 42b in the leaf spring elements 22b, i.e., in their attachment areas 24b (and possibly also in the other attachment areas provided for the attachment to the housing but not shown in the figure) are larger in the direction in which the leaf spring element extends between the two attachment areas than the shaft 80b of the fastening bolt 52b in its undeformed state. This size difference in the direction indicated is large enough that, as a result of the play thus provided, the leaf spring elements can shift by a total distance d with respect to each other, so that, even if the leaf spring elements 22b are all of the same design, the different radii of curvature of the upper and lower surfaces of the spring elements and the resulting mutual displacements in the area of the associated attachment areas 24b allow the shaft 80b of the fastening bolt 52b to be introduced through the holes 42b of all the leaf spring elements 22b of a leaf spring arrangement 16b of this type without producing any stresses of any kind. Because the fastening bolt 52b is usually designed as a clinch bolt, which is intended to undergo deformation as part of the attachment process performed after the introduction of the bolt 52b through the holes provided for it, the material of the bolt 52b, i.e., the material of the shaft area 80b of the bolt, will be pressed into the holes 42b, which are larger than the bolt, and thus compensate for the existing size difference. The arrangement shown in FIG. 11 is thus obtained, in which the holes 42b are then completely filled by the material of the bolt 52b.

In a design variant of this type, it is nevertheless also ensured that, after two or possibly more than two leaf spring elements 22b have been assembled and after the bolt 52b has been deformed, the leaf spring elements 22b are securely held in a defined position at their first or second attachment areas, and also that excessive friction or tensile stress between the leaf spring elements 22b is prevented. Even during the assembly process itself, the leaf spring elements 22b can assume positions with respect to each other in which they rest against each other essentially without tension in the no-load state.

Finally, the obvious conclusion should also be pointed out that, in all of the design variants described above, one of the configurations presented above can also be provided at both attachment areas, i.e., both at the connection to the pressure plate and at the connection to the housing. Of course, the various previously described design variants can also be combined with each other in the various attachment areas. In addition, it is also obvious that a leaf spring arrangement according to the invention can comprise more than two leaf springs.

The principles of the invention underlying the design of the leaf spring arrangements or of the individual leaf spring elements of the arrangements are important primarily in the case of pressure plate assemblies in which a self-reinforcing effect is produced as a result of the highly bent design of the leaf spring elements, that is, when the pressure plate is pressed with greater force against the friction lining of a clutch disk as a result of the stretching which occurs when the clutch is operating in friction mode and thus the connecting areas of the leaf spring elements become more closely aligned with the circumference.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate assembly comprising
   a housing,
   a pressure plate, and
   a leaf spring arrangement connecting said pressure plate to said housing with freedom of movement in the axial direction of the assembly, said leaf spring arrangement comprising a plurality of adjacent leaf spring elements, each leaf spring element comprising
      a first attachment area for establishing a connection with the pressure plate,
      a second attachment area for establishing a connection with the housing, and
      a connecting area extending between the first attachment area and the second attachment area, wherein at least part of the connecting areas of at least two adjacent leaf spring elements are spaced apart.

2. A pressure plate assembly as in claim 1 wherein said at least two adjacent leaf spring elements contact each other essentially only at said first attachment areas and said second attachment areas.

3. A pressure plate assembly as in claim 1 wherein said first attachment areas of said at least two adjacent leaf spring elements extend at an angle to the respective connecting areas, and the first attachment area of one of said at least two adjacent leaf spring elements is longer than the first attachment area of the other of said at least two adjacent leaf spring elements.

4. A pressure plate assembly as in claim wherein said second attachment areas of said at least two adjacent leaf spring elements extend at an angle to the respective connecting areas, and the second attachment area of one of said at least two adjacent leaf spring elements is shorter than the second attachment area of the other of said at least two adjacent leaf spring elements.

5. A pressure plate assembly as in claim 4 wherein said at least two adjacent leaf spring elements are substantially identical, the first attachment area of said one of said at least two adjacent leaf spring elements having the same length as the second attachment area of the other of said at least adjacent leaf spring elements, the second attachment area of said one of said at least two adjacent leaf spring elements having the same length as the first attachment area of the other of said at least two adjacent leaf spring elements.

6. A pressure plate assembly as in claim 3 wherein said second attachment areas of said at least two adjacent leaf spring elements extend at an angle to the respective connecting areas, and the first attachment area of the other of said at least two adjacent leaf spring elements is the same length as the second attachment area of the other of said at least two adjacent leaf spring elements.

7. A pressure plate assembly as in claim 6 further wherein at least part of the connecting areas of three adjacent leaf spring elements are spaced apart, said arrangement comprising an additional leaf spring element adjacent to said other of said leaf spring elements opposite from said one of said leaf spring elements, the second attachment area of said additional leaf spring element is shorter than the second attachment area of the other of said leaf spring elements.

8. A pressure plate assembly as in claim 1 wherein at least one of the first attachment areas and the second attachment areas extend at an angle to the respective said connecting areas, said arrangement further comprising a first spacer between each said at least one of the first attachment areas and the second attachment areas.

9. A pressure plate assembly as in claim 8 wherein said first spacer is formed discretely from said at least two adjacent leaf spring elements.

10. A pressure plate assembly as in claim 8 wherein said first spacer is formed as an integral part of one of said at least two adjacent leaf spring elements.

11. A pressure plate assembly as in claim 8 further comprising a second spacer between at least one of said first and second leaf spring elements which is adjacent to said housing and said pressure plate and at least one of said housing and said pressure plate.

12. A pressure plate assembly as in claim 11 wherein said second spacer is formed as an integral part of said at least one of said first and second leaf spring elements.

13. A pressure plate assembly as in claim 11 wherein said second spacer is formed as a part separate from said at least one of said first and second leaf spring elements.

14. A pressure plate assembly as in claim 8 further comprising a second spacer between at least one of said first and second leaf spring elements which is adjacent to said housing and said pressure plate, and at least one of said housing and said pressure plate, said first spacer and said second spacer being formed as an integral part of a single component.

* * * * *